(12) United States Patent
Yeo

(10) Patent No.: US 9,416,814 B2
(45) Date of Patent: Aug. 16, 2016

(54) CRADLE FOR A PORTABLE DEVICE

(71) Applicant: HSM CO., LTD., Seoul (KR)

(72) Inventor: Young Kyu Yeo, Seoul (KR)

(73) Assignee: HSM CO., LTD., Seoul (KR)

( * ) Notice: Subject to any disclaimer, the term of this patent is extended or adjusted under 35 U.S.C. 154(b) by 35 days.

(21) Appl. No.: 14/277,431

(22) Filed: May 14, 2014

(65) Prior Publication Data

US 2015/0230351 A1 Aug. 13, 2015

(30) Foreign Application Priority Data

Feb. 7, 2014 (KR) ........................ 10-2014-0014272

(51) Int. Cl.
*F16B 2/12* (2006.01)
*F16B 47/00* (2006.01)
*H04M 1/04* (2006.01)
*H04B 1/3877* (2015.01)

(52) U.S. Cl.
CPC . *F16B 47/00* (2013.01); *F16B 2/12* (2013.01); *H04B 1/3877* (2013.01); *H04M 1/04* (2013.01)

(58) Field of Classification Search
USPC ............... 248/349.1, 229.22, 229.24, 229.14, 248/229.12, 176.1, 177.1, 178.1, 1, 87.1, 248/154, 451, 447, 316.4, 316.6; 361/679.56
See application file for complete search history.

(56) References Cited

U.S. PATENT DOCUMENTS

| | | | | |
|---|---|---|---|---|
| 4,953,839 A * | 9/1990 | Chern | ................... | B23Q 1/5406 269/222 |
| 6,944,294 B2 * | 9/2005 | Tsay | ................... | B60R 11/0241 379/446 |
| 7,712,720 B1 * | 5/2010 | Cheng | .................... | B60R 11/00 248/205.5 |
| 8,469,325 B2 * | 6/2013 | Yu | .......................... | G10G 5/005 248/231.51 |
| 8,567,737 B2 * | 10/2013 | Chen | .................... | F16M 11/041 248/313 |
| 8,627,953 B1 | 1/2014 | Yeo | | |
| 8,727,192 B2 * | 5/2014 | Lai | ...................... | B60R 11/0241 224/282 |
| 8,833,716 B2 * | 9/2014 | Funk | ...................... | F16M 13/02 248/309.1 |
| 2006/0183511 A1 * | 8/2006 | Shen | ....................... | H04M 1/04 455/575.1 |
| 2012/0025035 A1 * | 2/2012 | Huang | .................... | F16M 11/04 248/122.1 |
| 2013/0134284 A1 * | 5/2013 | Hu | ........................ | F16M 11/041 248/451 |
| 2014/0328020 A1 * | 11/2014 | Galant | ................. | F16M 11/105 361/679.56 |
| 2015/0060624 A1 * | 3/2015 | Huang | ................. | H05K 5/0204 248/316.4 |

FOREIGN PATENT DOCUMENTS

| KR | 1020040074817 A | 8/2004 |
|---|---|---|
| KR | 1020070062402 A | 6/2007 |
| KR | 10-0796468 B1 | 1/2008 |

OTHER PUBLICATIONS

Korean Office action for 10-2011-0024222 mailed Dec. 31, 2012, citing the above reference(s).
Korean Office action for 10-2011-0024222 mailed Jun. 19, 2012, citing the above reference(s).

* cited by examiner

*Primary Examiner* — Alfred J Wujciak
(74) *Attorney, Agent, or Firm* — Hauptman Ham, LLP

(57) ABSTRACT

A cradle has a base, a hinge joint coupled with the base, and a holder. The holder is connected to the base at the hinge joint. The holder has a first case, a second case coupled with the first case, and at least two gripper arms coupled with the first case so that the gripper arms configured to hold the portable device on the first case. The first case and the gripper arms are swivel together on the second case.

9 Claims, 5 Drawing Sheets

US 9,416,814 B2

CRADLE FOR A PORTABLE DEVICE

CROSS-REFERENCE TO RELATED APPLICATION

The present application claims priority to Korean patent application number 10-2014-0014272 filed on Feb. 7, 2014, in the Korean Intellectual Property Office. The disclosure of the above-listed application is hereby incorporated by reference herein in its entirety.

FIELD

This disclosure relates to a cradle for a portable device.

BACKGROUND

The statements in this section merely provide background information related to the present disclosure and do not constitute prior art.

Various portable devices, such as vehicle navigators, multimedia players, portable broadcasting receivers and digital cameras/camcorders, as well as mobile phones are commonly used, and various accessories for such portable devices are developed. In particular, a cradle for holding a portable device is used for holding a portable device during driving or during study or business hours.

SUMMARY

In accordance with an embodiment, a cradle for holding a portable device comprises a base, a hinge joint coupled with the base and a holder. The holder is connected to the base at the hinge joint. The holder includes a first case, a second case coupled with the first case, and at least two gripper arms coupled with the first case so that the gripper arms configured to hold the portable device on the first case. The first case and the gripper arms are swivel together on the second case.

In accordance with another embodiment, a cradle for a portable device comprises an attaching base, a supporting neck formed on the attaching base, a rotatable jointer coupled with the supporting neck and a holder. The holder is connected to the base at the hinge joint. The holder comprises a housing unit, a groove formed in the center of the housing unit, a tooth gear housed in the housing unit and configured to be rotated around the groove, a fastener coupled with the housing unit at the side edge of the housing unit and configured to fasten the tooth gear by pressured contacting to the tooth gear, a top case having a hole and coupled with the housing unit, a push button installed on the tooth gear and protruded from the top case by passing through the hole of the top case, a first gripper arm immovably formed at a side edge of the top case, a second gripper arm coupled with the top case and the tooth gear, and an elastic member coupled with the second gripper arm. The tooth gear, the first and second gripper arms and top case are swivel together on the housing unit.

In accordance with another embodiment, a cradle for a portable device comprises an attaching base, a supporting neck formed on the attaching base, a rotatable jointer coupled with the supporting neck, a bottom case coupled with the rotatable jointer, a tooth gear housed in the bottom case, a fastener connected to the bottom case at a side edge of the bottom case, and configured to fasten the tooth gear by pressured contacting to the tooth gear, a top case coupled with the tooth gear, and at least two gripper arms coupled with the first case so that the two gripper arms configured to hold the portable device on the top case. The the top case, the gripper arms and tooth gear are swivel together.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
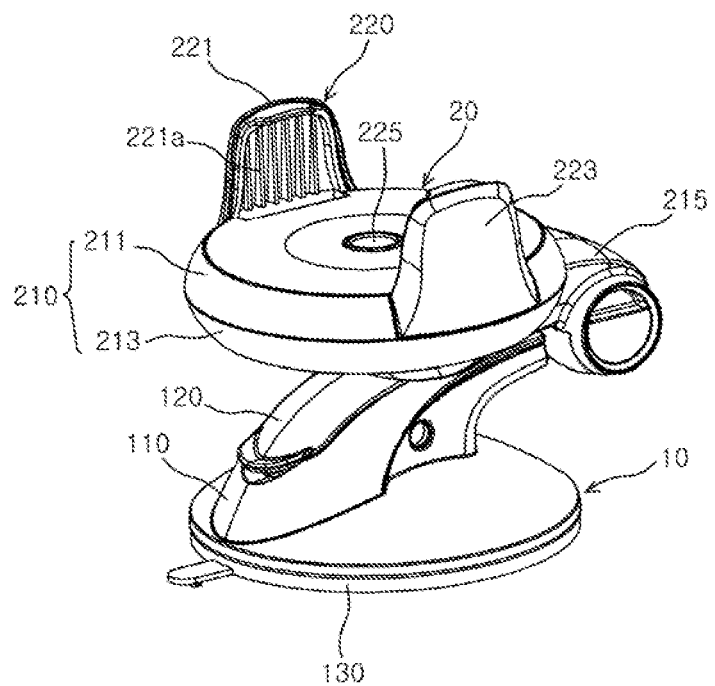
FIG. 1 is a perspective view of a cradle for a portable device according to at least one embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a perspective view of a cradle for a portable device according to at least one embodiment.

Referring to FIG. 1, a cradle for a portable device includes a base (10), a hinge joint (215) coupled with the base (10), and a holder (20) physically connected to the base (10) in a way that the holder can rotate relative to the base.

The base (10) includes: a column (110) as a supporting neck; a suction pad (130) fixed under the column (110); and a lever (120) which puts pressure on the suction pad (130) for the base (10) to be attached on the dashboard or windshield of a car and a desk in the office. A hinge joint (215) is connected to the upper part of the column (110) to place a ball. Thus, the base (10) and the holder (20) are connected to each other in a ball joint structure.

Figure 2:
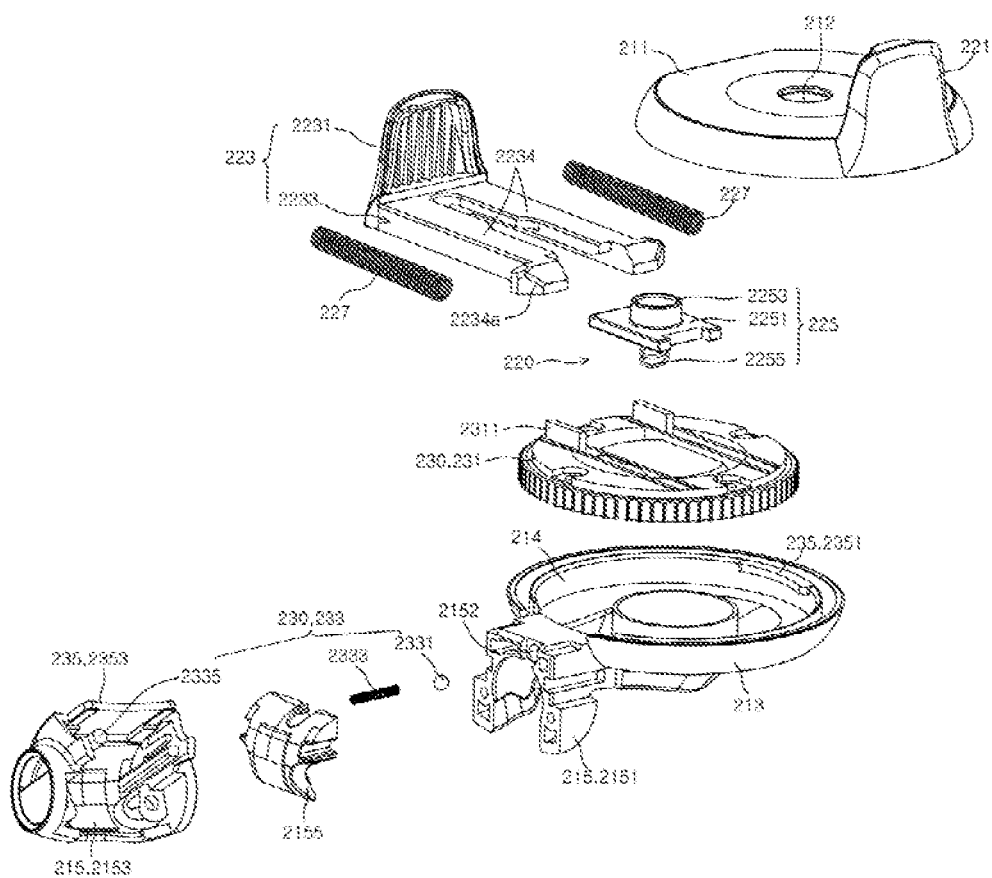
FIG. 2 is an exploded perspective view of the cradle illustrated in FIG. 1.

Referring to FIG. 1 and FIG. 2, the holder (20) includes: a main body (210) on which a portable device (e.g., a cell phone) is to be mounted; a holding unit (220) for holding the portable device mounted on the main body (210); and a rotation unit (230) for rotating the portable device on the holding unit (220).

The main body (210) includes a first cover (211) as a top case and a second cover (213) as a bottom case. The first cover (211) and the second cover (213) are presented as examples according to at least one embodiment, but it may be varied in design. The detailed structure of the first cover (211) and the second cover (213) will be described later in the section explaining details about the holding unit (220) and the rotation unit (230).

The holding unit (220) includes a first gripper arm (221), a second gripper arm (223), a push button (225) and elastic members (227).

The first gripper arm (221) is formed on one side edge of the outer surface of the first cover (211). The first gripper arm (221) protrudes from the outer surface of the first cover (211), and has a shock absorber (221a) installed on the inner side which physically contacts a portable device.

The second gripper arm (223) is coupled with the first cover (211) at the other side edge of the first cover (211). The second gripper arm (223) includes a grip unit (2231) on the opposite side of the first gripper arm (221), and a sliding unit (2233) extended perpendicularly from one side of the grip unit (2231) to be positioned into the main body (210).

The grip unit (2231) protrudes from the outer surface of the first cover (211), like the first gripper arm (221). A shock absorber may be installed on the inner side of the grip unit (2231), like the first gripper arm (221).

As described above, the sliding unit (2233) is extended perpendicularly from one side of the grip unit (2231) and is installed inside the first cover (211). An opening is formed on the other side edge of the first cover (211) so that the sliding unit (2233) can be positioned inside the first cover (211).

The sliding unit (2233) described above includes a pair of finger members (2234). The elastic members (227) in the first cover (211) elastically support the pair of finger members (2234). For this, a pressure member (2234a) physically connected to one elastic member (227) is formed on the distal end of each finger member (2234).

A distance between the finger members (2234) is varied along the length of the finger members (2234) to determine the position of the push button (225) when the finger members (2234) are pulled. For example, the finger members include a first section (391 in FIG. 3a) in which the distance between the pair of finger members (2234) is a first width (refer to G1, FIG. 3a) corresponding to a plate member (2251) of the push button (225), which will be explained later; and a second section (392 in FIG. 3a) in which the distance between the pair of finger members (2234) is a second width (refer to G2, FIG. 3a) corresponding to a protrusion member (2253) of the push button (225), which will be explained later.

Also, a stopper (2311) is formed on the upper side of a tooth gear (231) to keep the finger members (2234) from straying outside the main body (210), which will be explained later.

As explained above, the push button (225) is installed between the pair of finger members (2234). The push button (225) includes a plate member (2251) and a protrusion member (2253) protruded from the plate member (2251).

The plate member (2251) has a width corresponding to the first width (refer to G1, FIG. 3a) between the pair of finger members (2234). An elastic member or biasing element (2255) is installed under the plate member (2251) to elastically support the push button (225).

The protrusion member (2253) has a width less than the plate member (2251). In other words, the protrusion member (2253) has a width corresponding to the second width (refer to G2, FIG. 3a) between the pair of finger member (2234). The protrusion member (2253) protrudes to the outside of the first cover (211) by passing through a penetration hole (212) formed in the first cover (211).

Figure 3A:
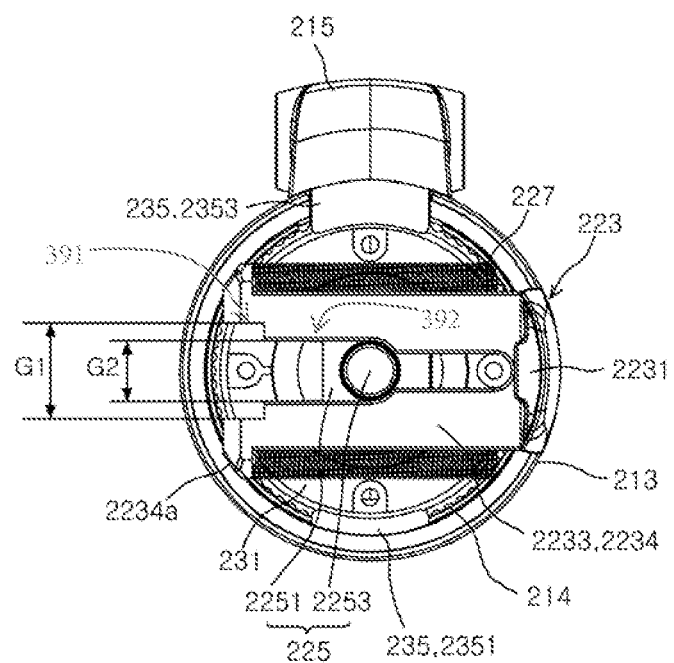
FIGS. 3a and 3b are diagrams explaining operation of a holder of the cradle in a holding state.
Figure 3B:
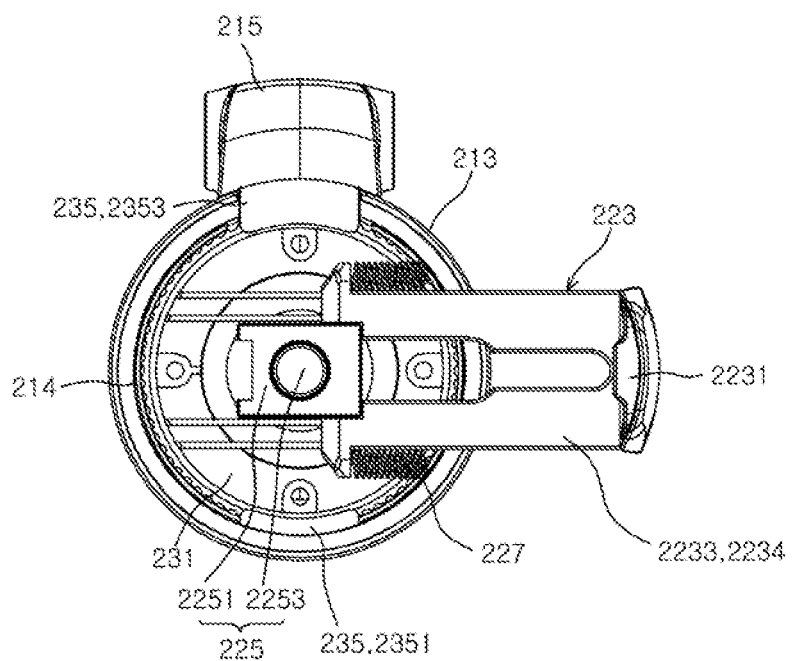

Meanwhile, the holding unit (220) mentioned above operates as described in the following description. FIGS. 3a and 3b are the cross-sectional views of the cradle without the second cover (213).

The initial status of the holding unit (220), as shown in FIGS. 2 and 3a, is that the pair of finger members (2234) is positioned inside the main body (210), and the protrusion member (2253) of the push button (225) is placed in the space between the pair of finger members (2234).

From the initial status described above, if a user pulls the second gripper arm (223) outward, pressure members (2234a) of the pair of finger members (2234) put pressure on each elastic member (227), and are slide outward as shown in FIGS. 2 and 3b.

The push button (225) moves upward through the space between the pair of finger members (225). To be specific, if the progress described above continues when the protrusion member (2253) of the push button (225) is positioned between the pair of finger members (2234), the plate member (2251) of the push button (225) is placed in the first width (G1) between the pair of finger members (2234) as shown in FIG. 3b, and prevents the second gripper arm (223) from being retracted inwardly under the elastic force of the elastic member (227). The protrusion member (2253) penetrates through the penetration hole (212) of the first cover (211), as the push button (225) is moved upward by the elastic member (2255). At the same time, the stopper (2311) on the top of the tooth gear (231) stops the second gripper arm (223).

Next, when a portable device is mounted on the front side of the first cover (211), the portable device puts pressure on the protrusion member (2253) and the push button (225) moves downward. As a result, the plate member (2251) of the push button (225) no longer prevents the second gripper arm (223) from being retracted inwardly, and the elastic force of the elastic member (227) pulls the second gripper arm (223) inwardly toward the first gripper arm (221) and enables the second gripper arm (223) to hold the portable device.

Figure 4:
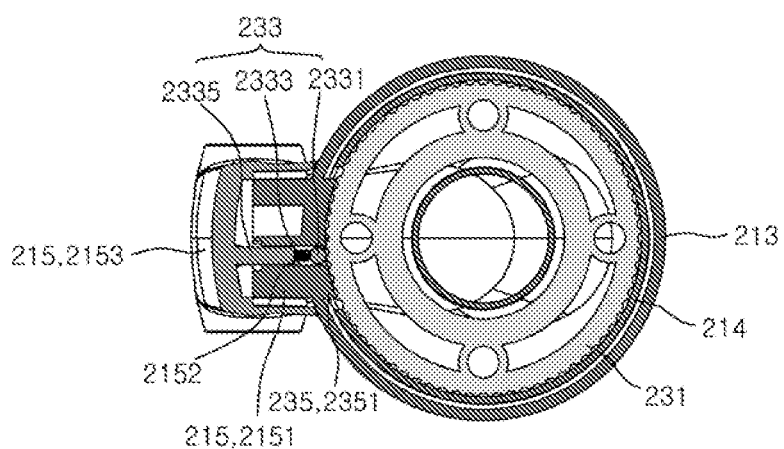
FIG. 4 is a cross-sectional perspective view of the cradle according to at least one embodiment.

Referring to FIGS. 2 and 4, the rotation unit (230) includes: a tooth gear (231); a gear holding unit (235) for preventing the tooth gear (231) from being detached; an fastener (233) for preventing free rotation of the tooth gear (231) by pressing sides of the tooth gear (231).

The tooth gear (231) has teeth around its side and is housed by a housing unit (214) formed inside the second cover (213) as being joined by a joining member, not shown in the figures, such as a bolt in the first cover (211).

Before explaining the details about the tooth gear (231), the second cover (213) is described as follows, The housing unit (214) housing the tooth gear (231) is formed in the second cover (213). The housing unit (214) protrudes from the bottom of the second cover (213), and has a ring shape.

On one side of the second cover (213), a hinge joint (215) includes a first hinge joint (2151) and second hinge joint (2153). In other words, each of the first hinge joint (2151) and the second hinge joint (2153) has a dome-shaped ball housing unit to house a ball smoothly with the combination of the first (2151) and the second (2153) hinge joints.

The gear holding unit (235) prevents the tooth gear (231) housed in the housing unit (214) from being detached so that the tooth gear (231) can rotate smoothly. The gear holding unit (235) includes a first gear holding member (2351) protruded to the inner side of the operating range of the housing unit (214) in the second cover (213), a second gear holding member (2353) extended from the inner side to the upper side of the second hinge joint (2153). A shock absorber member (2155) is installed in the second hinge joint (2153).

The first gear holding member (2351) is positioned on the upper side of the tooth gear (231) when the tooth gear (231) is housed in the housing unit (214). According to at least one embodiment, one first gear holding member (2351) is presented as an example, but it can be more than one.

The second gear holding member (2353) is positioned on the upper side of the tooth gear (231) housed in the housing unit (214) when the second hinge joint (2153) and the first hinge joint (2151) join together. The first gear holding member (2351) and the second gear holding member (2353) face each other.

The fastener (233) prevents the tooth gear (231) housed in the housing unit (214) from rotating freely so that the first cover (211) can be swivel and temporarily fixed at a desired rotational position. The fastener (233) includes a push ball (2331), an elastic member (2333), and a push pin (2335). The push ball (2331) and the elastic member (2333) are positioned in a penetration hole (2152) formed in the first hinge joint (2151). The penetration hole (2152) is formed at the operating range of the tooth gear (231) housed in the housing unit (214), corresponding to the outer side of the tooth gear (231). The push pin (2335) is formed in the second hinge joint (2153), and corresponds to the penetration hole (2152) in the first hinge joint (2151)

The rotation unit (230) explained above operates as follows.

The initial status of the rotation unit (230) is that the tooth gear (231) is housed in the housing unit (214) and pressed by the push ball (2331) on its one side.

To be more specific, the tooth gear (231) is joined with the first cover (211) by a joining unit (not shown in figures). The tooth gear (231) joined with first cover (211) is housed in the housing unit (214). At the same time, the tooth gear (231) is protected from being detached from the housing unit (214) by the gear holding unit (235).

The push ball (2331) puts pressure on one side of the tooth gear (231) by the force of the push pin (2335) pressing the elastic member (2333). The push ball (2331) pressed by the elastic member (2333) is placed in a Tooth space of the tooth gear (231), i.e., a space between successive teeth of the tooth gear (231).

At the initial stage described above, when a user swivels the first cover (211) joined with the tooth gear (231), the tooth gear (231) is swiveled accordingly. At the same time, the push ball (2331) pressed by the elastic member (2333) stepwise touches a Gear tooth (i.e., a tooth of the tooth gear (231)) and a Tooth space of the tooth gear (231).

If the push ball (2331) explained above physically contacts a Gear tooth when the tooth gear (231) is swiveled, the push ball (2331) moves along the external operating range of the tooth gear (231). If the push ball (2331) contacts a Tooth space of the tooth gear (231), it moves forward to the internal operating range of the tooth gear (231) by the elastic member (2333)

In the process described above, when the first cover (211) is swiveled as desired, the push ball (2331) pressed by the elastic member (2333) moves forward to a Tooth space of the tooth gear (231) to prevent free swivel of the tooth gear (231) and temporarily fix the tooth gear (231) at a rotational position corresponding to the Tooth space in which the push ball (2331) is received.

Therefore, according to at least one embodiment, as the push ball (2331) puts pressure on the side of the tooth gear (231) housed in the housing unit (214), the push ball (2331) is positioned in a Tooth space of the tooth gear (231) to prevent the free swivel of the tooth gear (231).

According to at least one embodiment, if a user swivels the first cover (211), the tooth gear (231) swivels accordingly as the push ball (2331) contacts the side (with alternatingly arranged Gear Teeth and Tooth spaces) of the tooth gear (231) repeatedly, being supported elastically by the elastic member (2333).

In other words, according to at least one embodiment, the rotation unit (230) locks and unlocks the swivel of the first cover (211) which is for receiving a portable device.

In the drawings and specification, there have been disclosed typical exemplary embodiments of this disclosure, and although specific terms are employed, they are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment are used singly or in combination with features, characteristics, and/or elements described in connection with other embodiments unless otherwise specifically indicated. Therefore, it will be understood by those of ordinary skill in the art that various changes in form and details can be made therein without departing from the spirit and scope of the claimed invention as set forth in the following claims.

What is claimed is:

1. A cradle for holding a portable device, comprising:
    a base;
    a hinge joint coupled with the base; and
    a holder connected to the base at the hinge joint,
    wherein the holder includes:
        a first case;
        a second case coupled with the first case; and
        at least two gripper arms coupled with the first case, the gripper arms configured to hold the portable device on the first case,
        wherein the first case and the gripper arms are swivel together on the second case,
        wherein the first case and the gripper arms are swivel together in a stepwise manner on the second case, and
    wherein the holder comprising further comprises:
        a hole on the first case, and
        a push button installed on the second case and protruded from the first case by passing through the hole of the first case,
        wherein a distance between the gripper arms is adjustable for holding the portable device in conjunction with the push button.

2. The cradle of claim 1, wherein the first case and the gripper arms are swivel together in a stepwise manner on the second case.

3. The cradle of claim 1, wherein one of the gripper arms is immovably formed at a side edge of the first case.

4. The cradle of claim 3, wherein the holder further comprises an elastic member coupled with the other gripper arm and configured to bias the other gripper arm so that the distance between the gripper arms is adjustable.

5. The cradle of claim 4, wherein the second case comprising:
    a housing unit, and
    a tooth gear housed in the housing so as to rotate in the housing unit,
    wherein the other gripper arm is coupled with the tooth gear so that the tooth gear, the gripper arms and the first case are swivel together on the housing.

6. The cradle of claim 5, wherein the other gripper arm is slidably moveable back and forth on the tooth gear in conjunction with the push button and the elastic member.

7. The cradle of claim 5, wherein the second case further comprises a fastener coupled with the housing unit at a side edge of the housing unit and configured to temporarily fix the tooth gear by pressured contact with the tooth gear.

8. The cradle of claim 7, wherein the first case and the gripper arms are swivel together in a stepwise manner on the second case.

9. The cradle of claim 8, wherein the other gripper arm is slidably moveable back and forth on the tooth gear in conjunction with the push button and the elastic member.

* * * * *